United States Patent [19]

Chan et al.

[11] Patent Number: 4,553,198
[45] Date of Patent: Nov. 12, 1985

[54] POWER CONVERTER SYMMETRY CORRECTION CIRCUIT

[75] Inventors: Edward Y. Chan, Lowell; Ross Henderson; Anthony J. Vaudo, both of North Reading, all of Mass.

[73] Assignee: Powercube Corporation, Billerica, Mass.

[21] Appl. No.: 448,622

[22] Filed: Dec. 10, 1982

[51] Int. Cl.⁴ .......................................... H02P 13/22
[52] U.S. Cl. ...................................... 363/56; 363/26; 363/97
[58] Field of Search ...................... 363/17, 25, 26, 56, 363/97

[56] References Cited

U.S. PATENT DOCUMENTS

| | | | |
|---|---|---|---|
| 4,005,352 | 1/1977 | Kugler | 363/26 |
| 4,150,426 | 4/1979 | Jansson | 363/97 |
| 4,233,658 | 11/1980 | Lupatin et al. | 363/26 |
| 4,404,623 | 9/1983 | Jourdan | 363/26 |
| 4,477,867 | 10/1984 | Pellegrino | 363/97 |

FOREIGN PATENT DOCUMENTS

| | | | |
|---|---|---|---|
| 2916833 | 11/1980 | Fed. Rep. of Germany | 363/26 |
| 2072964 | 10/1981 | United Kingdom | 363/56 |

OTHER PUBLICATIONS

Jansson, "A Sample-and-Hold Balancing and Protection Circuit for Push-Pull Switched-Mode Power Supplies," Willard Technical Communications, No. 140, pp. 424-438, Oct. 1978.

Primary Examiner—William H. Beha, Jr.
Attorney, Agent, or Firm—Weingarten, Schurgin Gagnebin & Hayes

[57] ABSTRACT

A pulse width modulated power converter having a single time multiplexed symmetry correction circuit operative to vary the pulse width of output drive pulses applied to an output transformer. As a result, the average current and thus the volt second product seen by each half of the transformer primary winding will be equal under steady state conditions. The transformer drive remains balanced over the entire dynamic range to prevent unwanted saturation of the transformer core.

9 Claims, 18 Drawing Figures

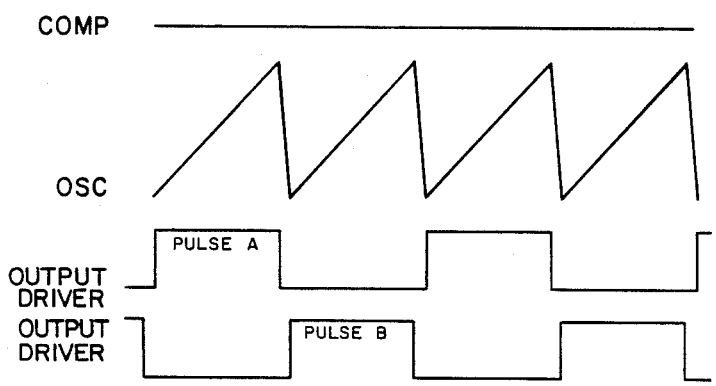
Fig. 6A
Fig. 6B
Fig. 6C
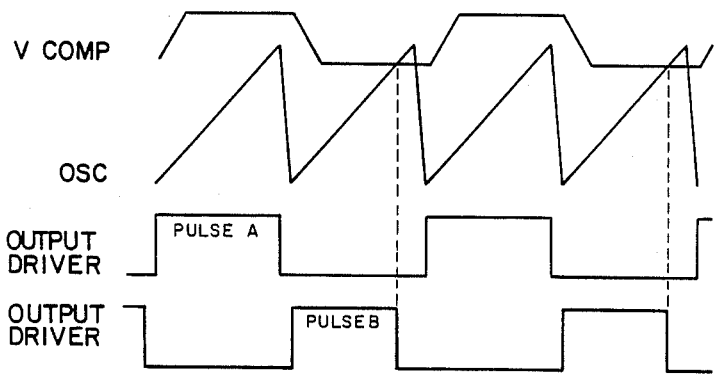
Fig. 7A
Fig. 7B
Fig. 7C

POWER CONVERTER SYMMETRY CORRECTION CIRCUIT

FIELD OF THE INVENTION

This invention relates to power supplies, and more particularly to power converter circuits using transformers and to techniques for preventing unwanted transformer saturation.

BACKGROUND OF THE INVENTION

In push-pull type power converter circuits which employ magnetic core transformers, unbalanced conditions in the transformer can cause a DC flux level to appear that results in unwanted saturation of the transformer core, and when such saturation occurs, the switching devices will usually become overstressed and fail. In an effort to avoid spurious saturation, matched transistors have been employed, and matching and trimming of associated components of the drive circuits to maintain balanced driving of the transformer. Such matching of components adds considerably to the cost of the overall circuit and can still result in some degree of mismatch which can cause nonuniform drive of the transformer and resulting saturation. Another technique which has been employed in an effort to minimize unbalanced transformer energization, utilizes special design of the magnetic circuit usually having a transformer air gap to provide for some level of DC current which flattens out the BH loop and results in a slower wavefront for the output voltage being generated. This latter approach results in increased ripple current. While these known approaches have worked reasonably well for lower voltages, lower power levels, and lower frequencies, they have not proved wholly reliable or of sufficient performance standard for higher switching frequencies, usually above 20 KHz.

SUMMARY OF THE INVENTION

The present invention provides a pulse width modulated converter having a single time multiplexed symmetry correction circuit operative to vary the pulse width of output drive pulses applied to an output transformer, such that the average current and thus the volt second product seen by each half of the transformer primary winding will be equal under steady state conditions. The symmetry correction provides balanced transformer drive over the entire dynamic range, even if voltage regulation is discontinued, as under open loop conditions, to prevent unwanted transformer saturation. The invention eliminates the need for specially designed magnetic circuits and also eliminates the need for matched or trimmed components in the transformer drive circuits.

DESCRIPTION OF THE DRAWINGS

The invention will be more fully understood from the following detailed description taken in conjunction with the accompanying drawing, in which:

FIGS. 3A-7C are waveforms useful in illustrating operation of the invention.

DETAILED DESCRIPTION OF THE INVENTION

Figure 1:
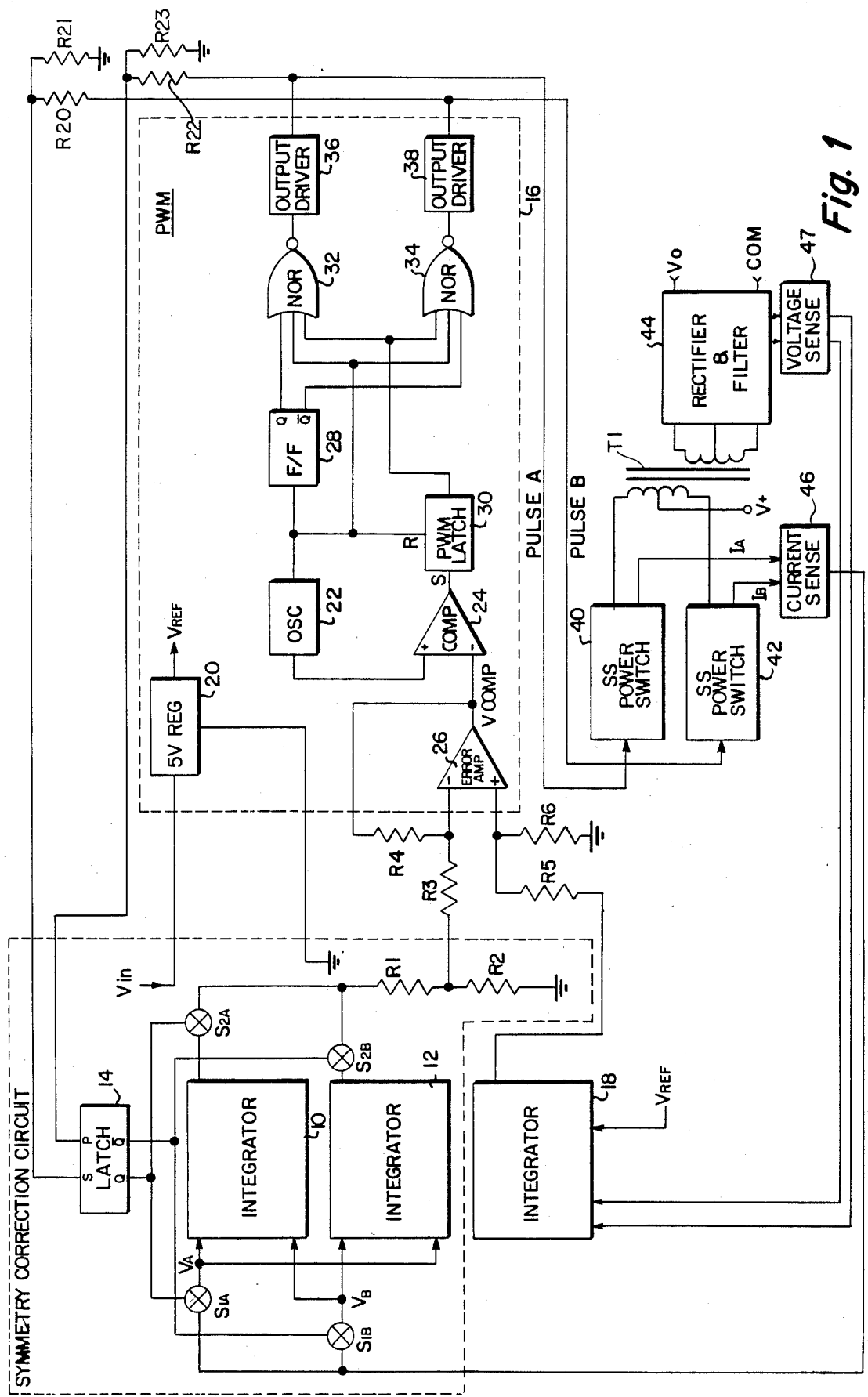
FIG. 1 is a block and schematic diagram of a converter circuit embodying the invention.

Referring to the drawing, the symmetry correction circuit includes two differential integrators 10 and 12, respective input switches S1A and S1B, and respective output switches S2A and S2B. The switches are preferably solid state switches, and are controlled by a synchronous latch 14 which is set and reset alternately in response to pulses derived via resistors R20, R21, R22, and R23 from the output drive pulses generated by a pulse width modulator (PWM) 16. The alternate pulses provided by the Q and $\overline{Q}$ outputs of latch 14 govern the operation of the switches S1A, S1B, S2A, and S2B, to provide time multiplexed operation by which the integrators 10 and 12 monitor the average value of respective voltages $V_A$ and $V_B$, and compare the average values with each other and continuously adjust the values toward equality. The Q output actuates the switches S1A and S2A during the interval of operation of integrator 10, while the $\overline{Q}$ output actuates the switches S1B and S2B during the interval of operation of integrator 12. Since the Q and $\overline{Q}$ outputs are complementary, the integrators are operative in alternating sequence in accordance with the alternating sequence of outputs from latch 14. The symmetry correction circuit can include a differential integrator 18 which includes a reference voltage source and functions as a voltage regulator.

The pulse width modulator 16 is an integrated circuit pulse width modulator having pulse by pulse control with latching circuitry and designed for use in switching power supplies. This integrated circuit is commercially available as the UC1525A of Unitrode Corporation. The PWM 16 includes a fixed voltage reference source 20 for providing regulated power to the internal circuitry of the integrated circuit as well as for providing a regulated voltage to circuitry of the converter. The PWM 16 also includes an oscillator 22 which generates a clock signal for the internal logic and a linear ramp signal to a comparator 24. An error amplifier 26 provides a reference input to the comparator 24 in response to an error voltage derived from the symmetry correction circuit. A toggle flip-flop 28 is provided for gating the PWM signal alternately between two outputs. Modulated pulses are provided by a PWM latch 30 and are gated via respective NOR gates 32 and 34 to respective output drivers 36 and 38 which provide the pulse width modulated pulses (pulse A and pulse B) in alternate manner. The output pulses are applied to respective solid state power switches 40 and 42 which provide push-pull drive of the output section of the converter.

The output section of the converter includes a magnetic core output transformer T1 having its primary winding connected to the respective solid state power switches 40 and 42, and its secondary winding coupled to a rectifier and filter circuit 44 which provides a DC output voltage $V_o$ at the output terminals. A sample of the output voltage is also fed back by sense circuitry 47 to the input of the integrator 18 for purposes of voltage regulation. The converter output voltage $V_o$ is compared with a reference voltage provided in integrator 18. The error signal generated at the output of integrator 18 is applied to the noninverting terminal of the error amplifier 26 of PWM 16. A sense circuit 46 senses the current through power switches 40 and 42 and provides a corresponding signal voltage to the integrators 10 and 12 via demultiplexing switches S1A and S1B.

The solid state power switches 40 and 42, in typical implementation, are each power pulse amplifying transistors of transistor stages operating in a push-pull configuration. The output pulses from PWM 16 provide the drive pulses for the respective power switches. Each power switch provides a pulse of a duration no longer than one-half the period of one operating cycle. The power switches are conductive alternately to cause current to be drawn through each half of the primary winding of transformer T1 which causes proportional flux energy in the transformer core and by transformer action produces a secondary voltage which is applied to the rectifier and filter circuit. Circuitry can be provided within the power switches to provide fast turn on and turn off of the current applied to transformer T1.

The currents $I_A$ and $I_B$ are sensed by the current sense circuit 46 which provides voltages $V_A$ and $V_B$ which are proportional to respective currents $I_A$ and $I_B$. Each integrator 10 and 11 generates an error voltage at its output of a magnitude representing the difference between its input voltage, $V_A$ or $V_B$, and the magnitude of its other input voltage. Thus, integrator 10 provides an error voltage at its output of a magnitude representing the voltage $V_A$, and integrator 12 generates an error voltage at its output of a magnitude representing the voltage $V_B$. The error voltages occur across resistor R2 in response to operation of the switches S1A, S1B, S2A, and S2B. During the active interval of one of the integrators 10 and 12, the output across resistor R2 from the other integrator is at 0 voltage level. Each error voltage from the integrators 10 and 12 is applied to a voltge divider composed of resistors R1 and R2 from which an error signal is derived for application to the inverting input of the error amplifier 26 of PWM 16 via resistor R3.

Imbalance between the power switches 40 and 42 can occur by reason of differences in storage times, switching times, saturation characteristics, or combination thereof. When an imbalance occurs, for example, due to longer storage time on power switch 40, the current $I_A$ through the power switch 40 is higher than the current $I_B$ through the power switch 42. The voltage $V_A$ is correspondingly larger than the voltage $V_B$, and integrator 10 will generate an error voltage at its output which is of greater magnitude than the error voltage generated by integrator 12. When the storage time is longer for power switch 42, the current $I_B$ will be greater than the current $I_A$, and an error voltage will appear at the output of integrator 12 of greater magnitude than the error voltage at the output of integrator 10 during its operating cycle. The error signal applied to error amplifier 26 of PWM 16 causes the error amplifier to provide an output voltage $V_{comp}$ which serves as a reference level for the comparator 24 of PWM 16, this reference level being adjustable in accordance with the operation of the symmetry correction circuit. The reference level is lowered during the interval of operation of the power switch having a longer storage time than the other power switch, such that a shorter duration pulse is provided during that interval by the PWM 16 to compensate for the difference in storage times between the two power switches. This adjustment of the output pulse durations will be further described below in connection with the waveforms of FIGS. 3–7.

The function of voltage regulation is performed by sense circuit 47 and integrator 18, which provides an error signal via a voltage divider composed of resistors R5 and R6 to the noninverting input of the error amplifier 26 of PWM 16. The input to the PWM 16 thus receives information both for output voltage regulation and for symmetry correction. The symmetry correction error signal is subtracted from the voltage regulation error signal on a pulse-by-pulse basis. Even during open loop conditions, when no voltage regulation is provided, the symmetry correction error signal still appears as an input to PWM 16 to provide symmetry correction of the drive pulses for the transformer T1.

Figure 2:
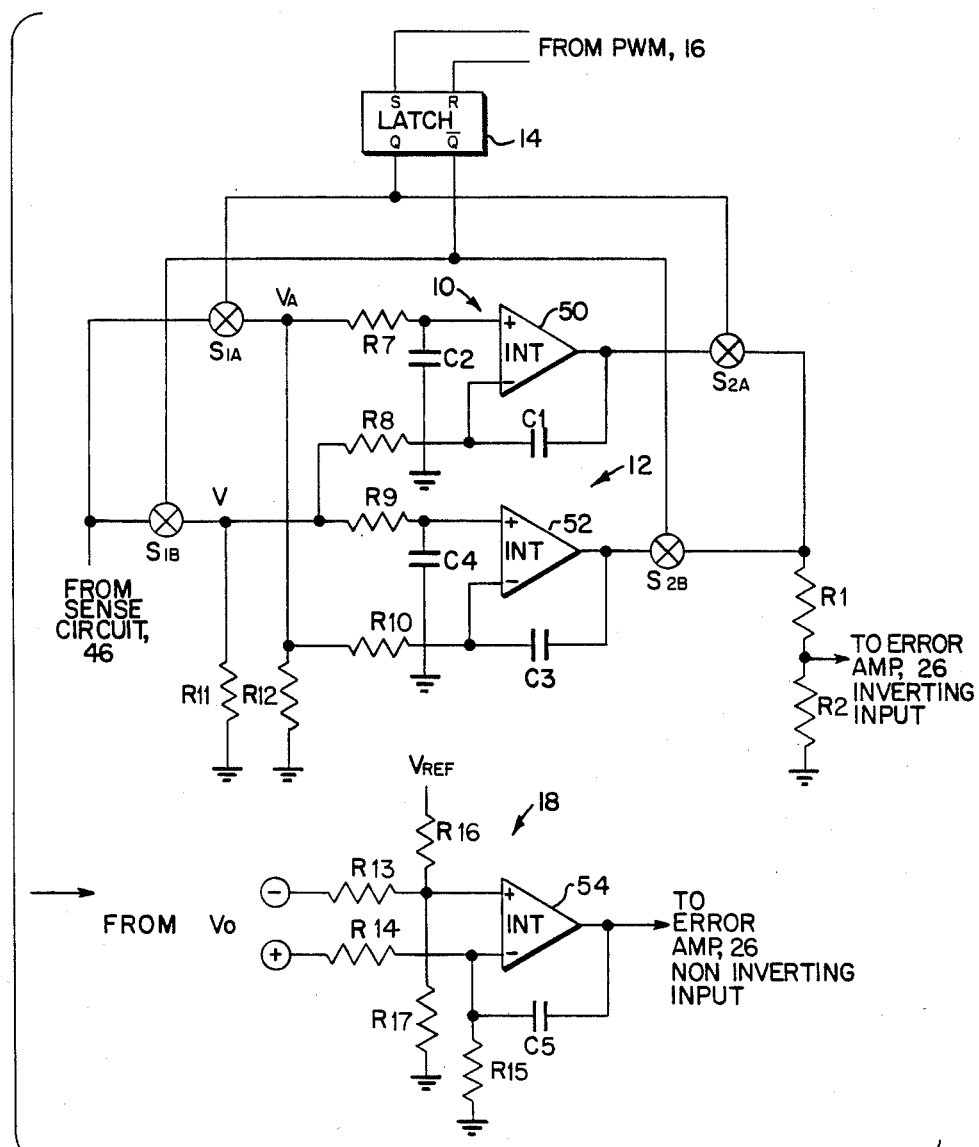
FIG. 2 is a schematic diagram of the symmetry correction circuit of FIG. 1.
Figure 3A:
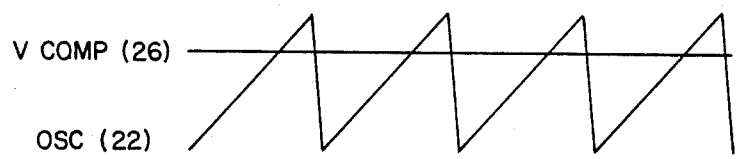
Figure 3B:
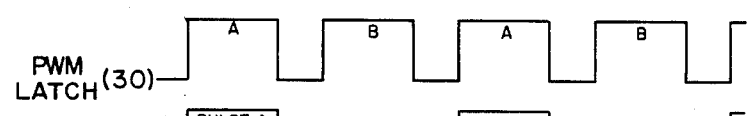
Figure 3C:
Figure 3D:
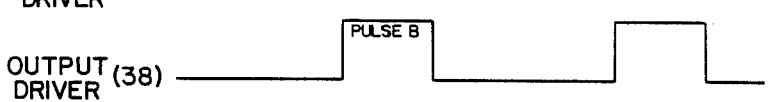

The symmetry correction circuit and integrator 18 are shown in a more detailed schematic diagram in FIG. 2. The integrator 10 is composed of a differential operational amplifier 50 having a feedback capacitor C1 and an input capacitor C2. The integrator 12 includes a differential operational amplifier 52 having a feedback capacitor C3 and an input capacitor C4. The input voltages $V_A$ and $V_B$ are coupled to the respective operational amplifiers by the resistor network composed of resistors R7–R12. The operational amplifier 50 receives a sample of the voltage $V_A$ at the noninverting terminal and a sample of the voltage $V_B$ at the inverting terminal. The operational amplifier 52 receives a sample of the voltage $V_B$ on the noninverting terminal and a sample of the voltage $V_A$ on the inverting terminal. The integrator 18 is also composed of a differential operational amplifier 54 having a feedback capacitor C5 and input resistors R13, R14, and R15 by which the voltage $V_o$ is applied. A reference voltage, typically 5.1 volts, is applied to the operational amplifier by way of resistors R16 and R17.

The waveforms of FIGS. 3–7 illustrated circuit operation under varying conditions. Circuit operation when power switches 40 and 42 are perfectly matched for switching times and saturation voltages is shown in FIGS. 3A–3D. The outputs of integrators 10 and 12 are each at 0 voltage level, and no symmetry correction is required. FIG. 3A illustrates the reference level ($V_{comp}$) provided by error amplifier 26, and the ramp voltage is provided by oscillator 22. FIG. 3B represents the pulses provided by PWM latch 30, the duration of which is determined by the time at which the ramp voltage crosses the reference level. The FIGS. 3C and 3D illustrate, respectively, the pulses provided by output drivers 36 and 38. The output pulses A and B illustrated in FIGS. 3C and 3D are of uniform and equal width with respect to each other under these uniform conditions.

Figure 4A:
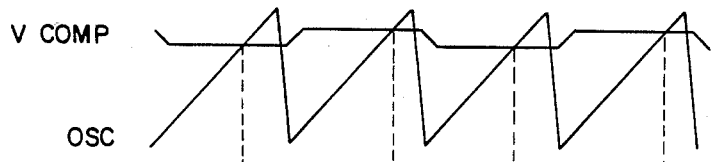
Figure 4B:
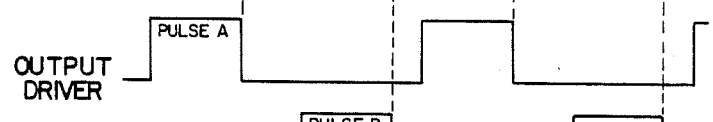
Figure 4C:
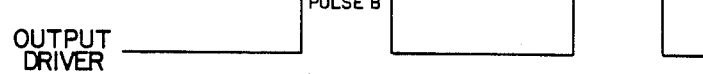
Figure 5A:
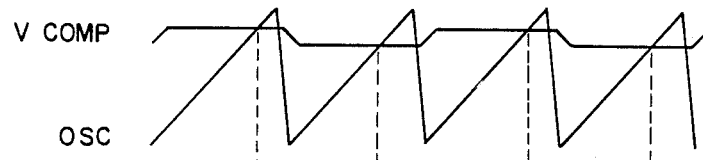
Figure 5B:
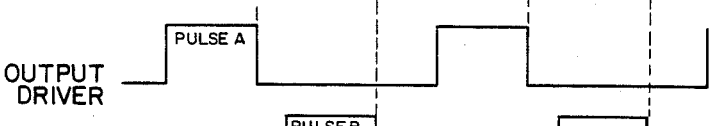
Figure 5C:
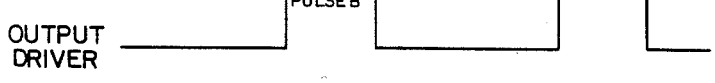

The waveforms of FIGS. 4A–4C illustrate the condition when power switch 40 has a longer storage time than power switch 42. The reference level ($V_{comp}$) is modified by the symmetry correction circuit in the manner shown in FIG. 4A. The reference level is lowered during the interval of operation of power switch 40, in response to the error signal from integrator 10, to produce a shorter duration pulse A to compensate for the difference in storage times between the power switches. The situation when power switch 42 has a longer storage time than power switch 40 is depicted in FIGS. 5A–5C. Here the reference level is lowered during the interval of operation of power switch 42 to produce a shorter duration pulse B to compensate for the difference in storage time.

The waveforms of FIGS. 6A–6C illustrate the condition in which the voltage regulation loop is open or in which there is a low supply voltage V+, and in which the power switches 40 and 42 are matched in their essential characteristics. No symmetry correction is required, and output pulses A and B are provided of uniform and equal width. In the waveforms of FIGS. 7A–7C, the voltage regulation loop is again open or there is a low supply voltage V+. In this case, power switch 42 has a longer storage time than power switch 40. The reference level is lowered during the interval of operation of integrator 12 to produce a shorter duration pulse B to offset the difference in storage times of the power switches. Symmetry correction is thus provided even through the voltage regulation loop is not operative.

The symmetry correction circuit can be readily implemented as a modular circuit for use with an associated pulse width modulator in a power converter. The invention is especially useful in pulse width modulated push-pull converter circuits, and can also be employed in half bridge and full bridge power supply circuits. The symmetry correction circuit can also be employed in generator circuits which are power supply circuits without a rectifier and voltage regulator. Accordingly, the invention is not to be limited by what has been particularly shown and described except as indicated in the appended claims.

We claim:

1. For use in a power converter having a magnetic core transformer having a primary and a secondary winding, a pair of solid state power switches for push-pull drive of the transformer and an output circuit for providing an output voltage derived from the transformer, a circuit comprising:
   output voltage sense means for producing an output voltage sense signal from the secondary winding;
   a pulse width modulator coupled to the solid state power switches and operative to apply pulse width modulated pulses alternately to the power switches for push-pull drive of the transformer having pulse duration controlled according to said output voltage sense signal;
   a symmetry correction circuit operative in response to the output currents of the power switches to provide a single error signal being time-multiplexed to include a representative sample of the magnitude of each current, further including:
   first and second integrators each operative to provide a respective error voltage derived from and representing the output current of respective ones of the power switches; and
   means for actuating each of the first and second integrators in alternating sequence to alternately receive said error signal and provide the integrator error voltages; and
   means for selectively applying the single error signal to the pulse width modulator to cause adjustment of the duration of the modulated pulses to compensate for the difference in characteristics between the power switches.

2. The invention of claim 1 including a current sense circuit operative to provide a representation of the output current of each of the power switches to the first and second integrators.

3. The invention of claim 1 wherein said means for actuating each of the first and second integrators includes:
   a plurality of switches; and
   means for controlling the operation of the switches for actuation of each of the first and second integrators in alternating sequence.

4. The invention of claim 1 wherein the first and second integrators each include a differential operational amplifier circuit.

5. The invention of claim 4, wherein
   each said differential operational amplifier has a non-inverting and an inverting input,
   said means for actuating includes a first and a second input switch for each said first and second integration, each input switch receiving said single error signal, and
   each said non-inverting and inverting inputs of each said differential operational amplifier selectively receives said single error signal from different said input switches.

6. The invention of claim 5 wherein
   said first input switch selectively provides said single error signal to said non-inverting input of said first differential operational amplifier and to said inverting input of said second differential operational amplifier, and
   said second input switch selectively provides said single error signal to said non-inverting input of said second differential operational amplifier and to said inverting input of said first differential operational amplifier.

7. The invention of claim 6, wherein
   at least one of said differential operational amplifiers of said first and second integrators include a feedback capacitor between the output of each said differential operational amplifiers and each respective inverting inputs to provide integration of the signals received, the resulting signals being selectively applied to said pulse width modulator.

8. A power converter comprising:
   an output circuit including a magnetic core transformer having a primary winding adapted for push-pull drive and an output winding for providing an output voltage;
   output voltage sensor means for providing an output voltage sense signal corresponding to said output voltage;
   a pair of solid state power switches coupled to the primary winding of the transformer and providing push-pull drive thereof;
   a pulse width modulator coupled to the power switches and operative to alternately apply pulse width modulated pulses to the respective switches according to said output voltage sense signal;
   current sense means providing a single current sense signal representing the current applied to said primary by said push-pull drive circuit; and
   a symmetry correction circuit operative to vary the pulse width of the modulated pulses according to said single current sense signal such that the average current provided by the power switches to the primary winding of the transformer is substantially equal, further including:
   first and second integrators each operative to provide a respective error voltage derived from and representing the output current of respective ones of the power switches; and
   means for selectively receiving said single current sense signal and for actuating each of the first and second integrators in alternating sequence to alternately provide the error voltages.

9. The invention of claim 8 wherein said means for receiving and actuating each of the first and second integrators includes:
   a plurality of switches; and
   means for controlling the operation of the switches for actuation of each of the first and second integrators in alternating sequence.

* * * * *